United States Patent [19]

Kramer

[11] Patent Number: 5,692,860

[45] Date of Patent: Dec. 2, 1997

[54] ON-EDGE END MILLING CUTTER AND INSERT

[76] Inventor: Rodney M. Kramer, 2601 Fisk Ave., Rockford, Ill. 61102

[21] Appl. No.: 466,216

[22] Filed: Jun. 6, 1995

[51] Int. Cl.[6] .................................................. B23C 5/20
[52] U.S. Cl. ............................ 407/34; 407/53; 407/56; 407/113
[58] Field of Search ............................ 407/34, 52, 53, 407/56, 61, 62, 113

[56] References Cited

U.S. PATENT DOCUMENTS

| | | |
|---|---|---|
| 4,175,896 | 11/1979 | Kishinami et al. . |
| 4,411,564 | 10/1983 | Johnson . |
| 4,566,827 | 1/1986 | Neumueller . |
| 4,569,619 | 2/1986 | Newton ................................. 407/15 |
| 4,681,485 | 7/1987 | Koelewijn ........................ 407/113 X |
| 4,699,549 | 10/1987 | Shimomura et al. ................ 407/62 X |
| 4,714,383 | 12/1987 | Shimomura et al. ................ 407/62 X |
| 5,108,234 | 4/1992 | Stojanovski ....................... 407/113 X |
| 5,314,269 | 5/1994 | Arai et al. ........................... 407/56 X |
| 5,556,239 | 9/1996 | Reiterman . |

FOREIGN PATENT DOCUMENTS

| | | | |
|---|---|---|---|
| 3618574 | 12/1986 | Germany | ................................ 407/34 |
| 3624861 | 2/1987 | Germany | ................................ 407/61 |
| 54-111188 | 8/1979 | Japan . | |
| 54-145086 | 11/1979 | Japan . | |

*Primary Examiner*—Daniel W. Howell
*Assistant Examiner*—Henry W. H. Tsai
*Attorney, Agent, or Firm*—Fitch, Even, Tabin & Flannery

[57] ABSTRACT

A small diameter endmill and cutting insert therefor especially adapted to endmills of small diameter, e.g., three inches or less, by virtue of a cylindrically convex flank surface of radius of curvature preferably greater than the radius of the cutting path of the endmill.

10 Claims, 4 Drawing Sheets

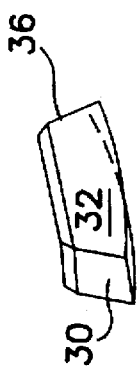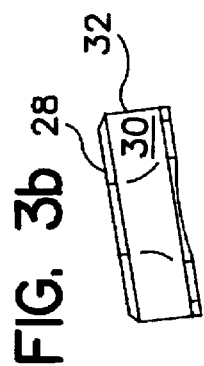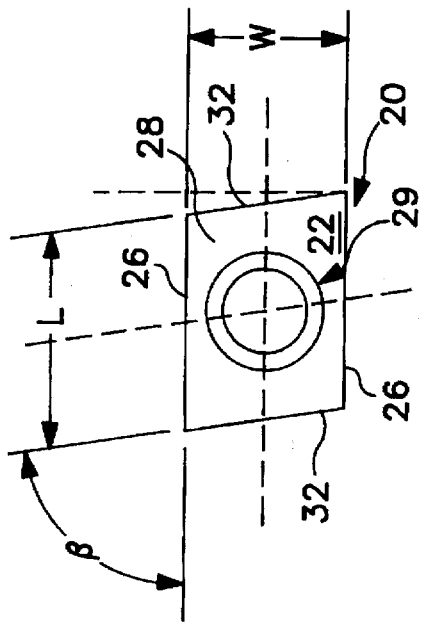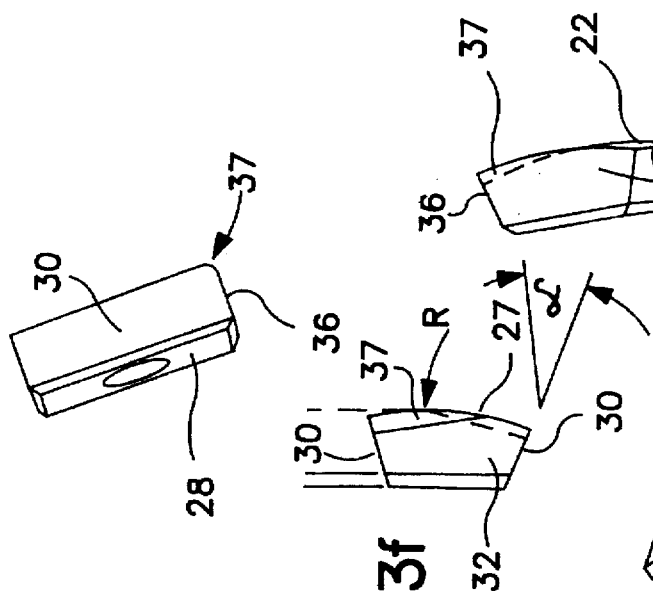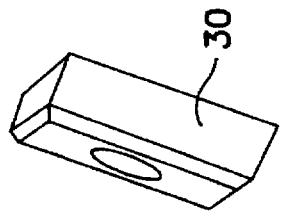

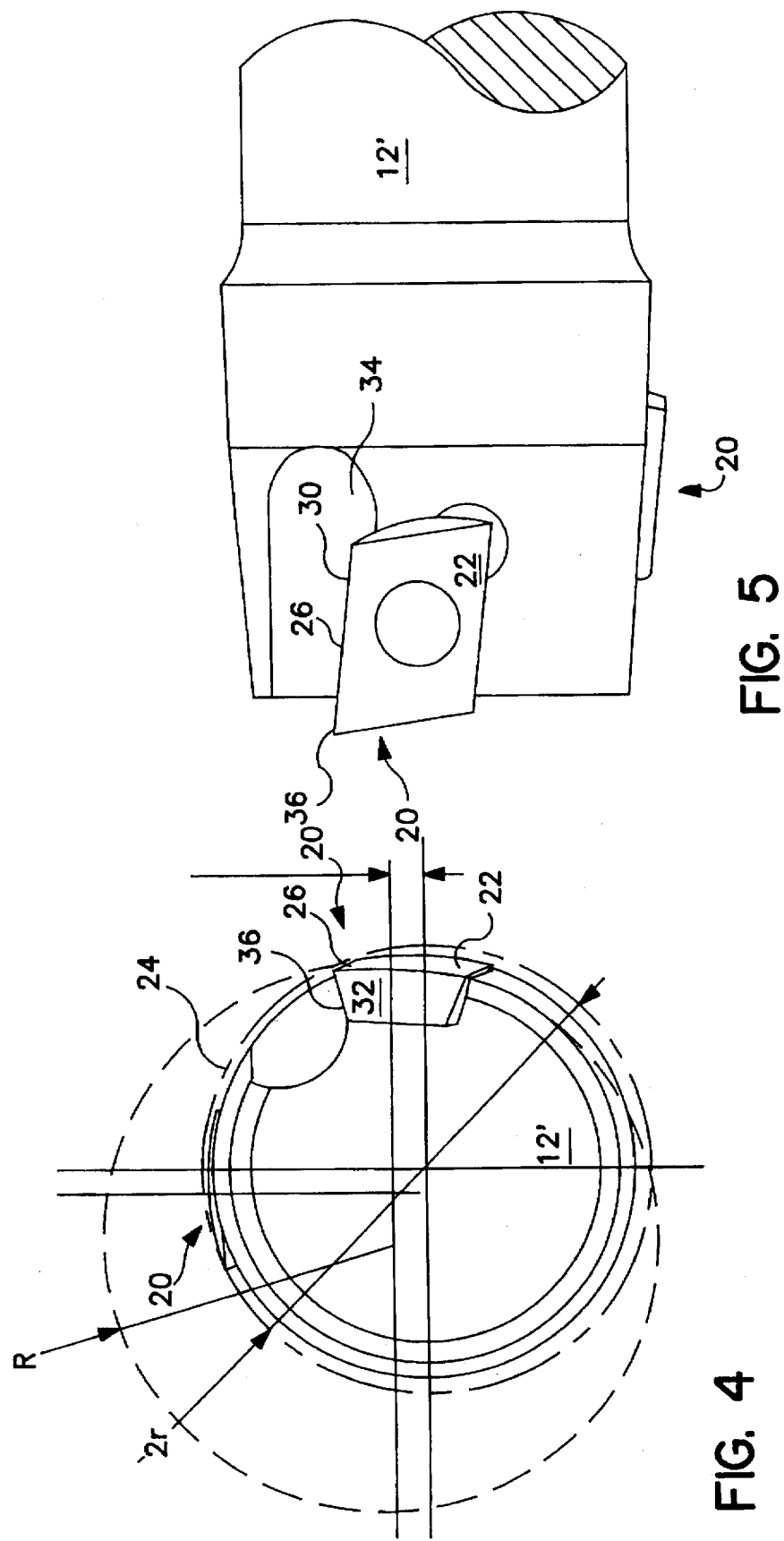

ON-EDGE END MILLING CUTTER AND INSERT

BACKGROUND OF THE INVENTION

This invention relates to milling cutters and particularly to a cutting insert found unexpectedly capable of extremely high metal removal rates when used as an endmill insert in relatively small diameter endmills machining high-strength ductile metals.

While the on-edge, tangentially mounted, indexable cutting insert has been appreciated for its generally superior service, believed attributable to the direction of the cutting force reaction through the greater thickness of the cutting insert, and to the greater rigidity of the cutter body maintainable due to the lesser invasion of cutter bodies required to mount such inserts, these advantages have been difficult to realize in small endmills, i.e., those having a diameter of three inches or less. With such small swing radii, the cutting geometry desirable for cutting ductile metals can direct the resultant cutting force reaction out of the conventional on-edge insert, rather than through its greater dimension, which stresses the insert material in a disadvantageous way that causes the breakage of the inserts at cutting speeds and feed rates they would be well able to sustain at larger tool radii.

In the past, the insert-weakening effect of positive radial rake at small swing radii has been compensated to some extent by providing a primary clearance land on the clearance face of the insert immediately behind the cutting edge of the rake face, such, for example, as is shown by U.S. Pat. No. 4,712,949, William B. Johnson, owned by the assignee of this invention. The strengthening of the insert achievable by that measure alone is, however, limited.

The present discovery, made in the quest for insert geometry that might provide a self-renewing cutting edge without significant loss of swing radius as the rake face of the insert wore and wear land developed, has unexpectedly resulted in a cutting insert of exceeding durability in small-radius endmill service under extremely high metal removal loads.

SUMMARY OF THE INVENTION

The foregoing advantages, detailed in the specifics hereinafter to follow, are achieved by an insert which is configured to conform, as closely as possible, i.e., with minimum clearance, to the swing path of the cutting edge of the rake face.

In its preferred form, the on-edge insert of the invention has a major plane seating surface in the form of a parallelogram, using the term in its broad sense also to include a square, rhombus, or rectangle, from opposed sides of which the rake faces rise divergently, with their cutting edges joined by the second and larger major surface of the insert which is convex, and, for adaptability, made in the form of a segment of a right circular cylinder.

The resulting thickening of the insert behind the cutting edge, i.e., in the direction perpendicular to the active rake face, and also between its major surfaces, has dramatically increased the cutting load capability of an endmill so equipped.

DESCRIPTION OF THE DRAWINGS

FIG. 3 is a series of related projections of the improved cutting insert of the invention, as follows:

FIG. 3(a) is a top view;

FIG. 3(b) is a projection to a plane perpendicular to the ends of the insert as seen in FIG. 3(a);

FIG. 3(c) is an endwise projection of FIG. 3 (b);

FIG. 3(d) is an endwise projection of the insert of FIG. 3(a);

FIG. 3(e) is a projection of the insert of FIG. 3(d) to a plane perpendicular to the end surfaces of the insert of FIG. 3 (d);

FIG. 3(f) is an endwise projection of the insert of FIG. 3 (a); and

FIG. 3(g) is a projection of the insert of FIG. 3(f) to a plane parallel to the rake face of the insert of FIG. 3(f);

FIG. 4 is a diagrammatic end view of a two-tiered endmill in accordance with the invention, illustrating in Cartesian terms the proper placement therein of the inserts of the invention;

FIG. 5 is a side elevation of the endmill of FIG. 4;

DESCRIPTION OF THE PREFERRED EMBODIMENT

Figure 1:
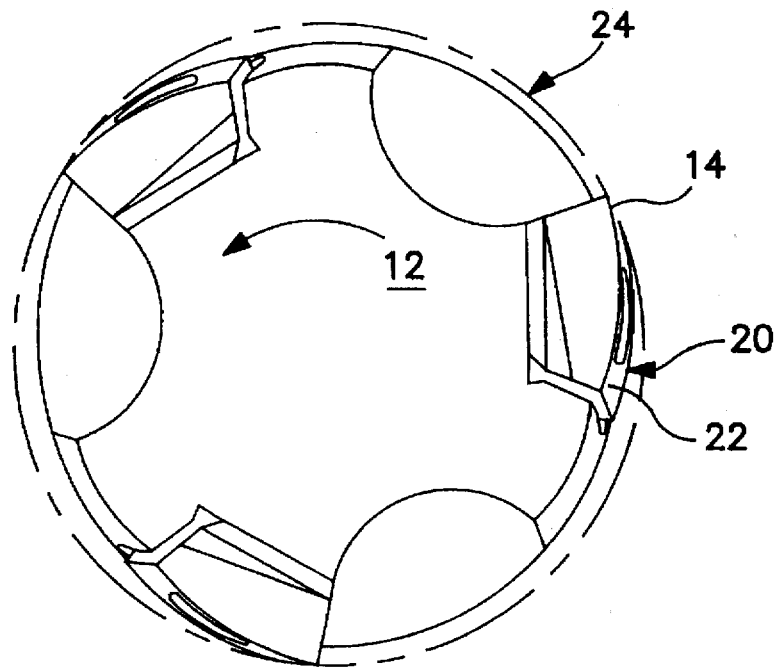
FIG. 1 is a bottom end view of an endmill in accordance with the invention.
Figure 2:
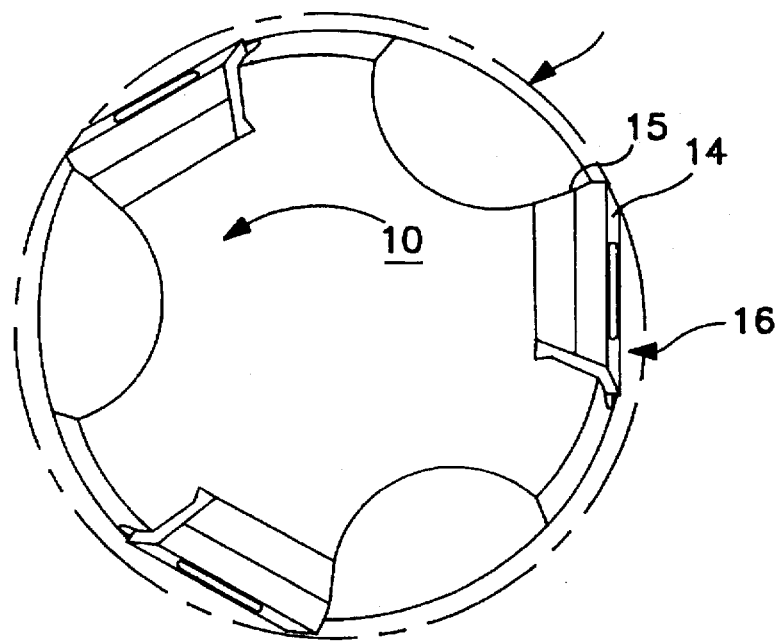
FIG. 2 is a bottom end view of a known endmill.

As shown by the comparative end views of two small three-bladed endmills with tangentially-mounted, so-called "on edge" inserts, the endmill 10 of FIG. 2 in accordance with the prior art, and the endmill 12 of FIG. 1 in accordance with the invention, the radially outermost or flank Surface 14 of the prior art insert 16 is plane and parallel to its lesser opposite surface engaged with the complementary seating surface of the insert pocket milled in the cutter body.

It will be appreciated that as the conventional double-rake-face insert 16 is adapted to endmills of smaller swing radii, maintenance of equivalent cutting geometry results in a progressively more acute angle at the cutting edge, i.e., between the rake faces and the flank or clearance face 14 of the insert. Put another way, the maintenance of the same cutting geometry at smaller radii deprives the cutting edge of the backup material to resist the cutting forces that the same cutting geometry would permit in endmills of larger swing radii.

The resulting weakening of the conventional insert 16 at lesser cutting radii reduces its cutting load capability, as has been shown by the catastrophic failure of such inserts, i.e., the fracture of the insert body, at cutting loads which would be endurable in endmills of equivalent cutting geometry at larger swing radii, using the conventional flat-topped double-rake-face indexable insert 16.

The endmill 12 and indexable double-rake-face insert 20 of the invention illustrated in FIG. 1 solve that problem by providing a convex flank surface 22 which serves the dual purpose of providing a smaller flank or clearance angle between the flank surface 22 and the cutting path 24, and strengthening the cutting edge 26 by the greater mass of insert material behind it.

In comparative test at a cutting diameter of one-and-one-half inches using inserts of the same carbide grade with four effective inserts per endmill, and with identical rake-face dimensions and cutting geometry and an 0.03 inches cornering radius between the wiping and side-cutting edges, the conventional, double-rake-face indexable insert and the insert of the invention were subjected to the following test conditions while cutting a test block of 4140 chrome-manganese steel of hardness 30 HRC:

|  | Test 1 | Test 2 | Test 3 |
|---|---|---|---|
| Speed RPM | 1350 | 1350 | 850 |
| Speed SFM | 530 | 530 | 334 |
| Feed IPM | 43.2 | 64.8 | 40.8 |
| Feed IPT | 0.008 | 0.012 | 0.012 |
| Width of Cut, inches | 1.0 | 1.0 | 1.0 |
| Depth of Cut, inches | 0.10 | 0.10 | 0.10 |
| Coolant | None | None | None |
| Length of Cut | 200" | 200" | 80" |

Under these severe test conditions, the insert 20 of the invention, as shown in FIGS. 1 and 3, exhibited a mere 0.005 inches nose wear, minimal flank wear, and only moderate thermal cracks after Test 1, whereas the conventional flat-topped inserts 16 suffered catastrophic failure of all inserts on the first pass of the cutter.

After Test 2, with its 50% higher feed, other conditions remaining the same, the inserts 20 of the invention showed exactly the same result as in Test 1, i.e., 0.005 inches nose wear, minimal flank wear, and moderate thermal cracking, whereas the conventional flat-topped inserts 16 again suffered catastrophic failure on the first pass of the cutter.

In Test 3, at the lesser cutting speed of 850 RPM and feed rate of 40.8 inches per minute over a cut 80 inches in length, the convex-top inserts 20 of the invention exhibited only minimal nose wear and minimal flank wear, although a corner of one of the four inserts had fractured. The conventional flat-topped inserts 16 all experienced catastrophic failure on the first pass of the tool in the cut.

The insert 20 of the invention which achieved these results is shown in detail in FIGS. 3(a) to 3(g). It is a skewed parallelogram in plan, that being the shape of its major seating surface 28. Its two opposed rake faces 30 diverge at equal angles α from the seating surface, 73° in the illustrated case (17° from a perpendicular to the seating surface), as they rise to the cylindrically convex flank surface 22 of the insert. In the illustrated case, the radius of curvature R of the cylindrically convex flank surface is 0.7617 inches, slightly greater than the swing radius of a one-and-one-half inch diameter endmill. For those dimensions, the width W of the insert, measured perpendicular to its cutting edges 26, is 0.375 inches, the length L measured perpendicular to the end faces 32 of the insert, is 0.500 inches, and the acute angle β of the seating surface 28 is 78° as shown. The edges of the seating surface are chamfered with a flat of 0.020 inches in width.

A central fastener hole 29 is countersunk from the convex flank surface 22.

When installed in the cutter body with positive axial rake, as shown in FIG. 5, the upper end 34 of the cutting edge 26 is appropriately tipped outwardly to place both ends of the cutting edge 26 at the same swing radius (see FIG. 4), and the trailing edge of the insert, the unused alternate cutting edge 26, is depressed radially to achieve the desired flank angle between the flank surface 22 and the cutting path. That angle, measured between tangents to the flank surface and to the cutting path, respectively, at the cutting edge, will desirably be chosen to minimize flank wear and to enable the endmill to maintain its designed cutting radius r at least approximately, notwithstanding flank wear.

At the corner of the wiping edge 36 and the side cutting edge 26, a radius 37 (FIGS. 3(a), (e), and (f)) of 0.030 inches to 0.125 inches may be provided, according to the filleting requirement of the workpiece, and is applied as a non-parallel radius in accordance with U.S. Pat. No. 4,411,564, owned by a company related to the assignee of this invention.

As earlier indicated, the rake faces and the seating surfaces of the comparatively tested inserts were of the same dimensions and configuration, and were positioned with the same cutting geometry in the same cutter body. The thickness of the conventional insert, measured between the parallel seating and flank surfaces, was 0.150 inches. The thickness T of the insert of the invention, also taken perpendicular to the plane of the seating surface (FIG. 3(f)), measured 0.1734 inches at the crest of the convex flank surface, i.e., midway between the alternative rake faces, and 0.150 inches at the intersection of the flank surface with the rake face, i.e., at the cutting edge.

This relatively small amount of material, providing, as it were, an integral convex "cap" on the otherwise flat flank surface of the conventional double-rake-face insert design, produces a remarkable strengthening of the insert against the cutting forces directed through the insert when used in endmills at the lower end of the range of diameters, i.e., from three inches down to 0.625 inches.

The insert 20 of the invention has been illustrated and described as a skewed parallelogram form of insert, suitable especially for service at the nose position of the endmill (FIGS. 1 and 5), where the combination of the need for heeling clearance behind the wiping edge 36 and positive axial rake to lift the chip from the cut, dictate the skewed parallelogram shape. The same insert finds equal employment in upper, secondary positions on the tool.

In the illustrated form of the cutter of the invention (FIGS. 1, 4, and 6), the radius of curvature R of the convex cylindrical flank surface 22 of the insert is somewhat greater than the swing radius r of the endmill. The same insert will render useful service at greater cutter radii up to a swing radius above which the advantage of the convex flank 22 of the curvature of the given insert, relative to the flat flank 14 (FIG. 2), diminishes along with its increasing inability to provide necessary flank clearance at desirable angles of radial rake. For example, an insert design with the convex curvature preferred for a cutter diameter of one-and-one-half inches can be used advantageously in cutters of diameter up to two inches.

Figure 7:
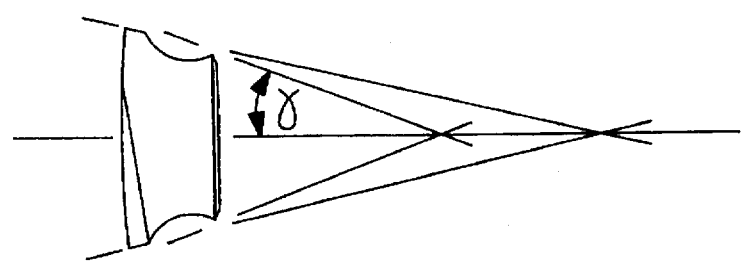
FIG. 7 is a modified form of the insert of FIG. 3, with "hooked" or concave rake faces for more positive radial rake in the cutter body.

The same insert may also be used in endmills of lesser diameter, but it will be appreciated that the cutting geometry will become increasingly negative, as it does indeed with conventional inserts, and may make it desirable to groove the rake faces concave in order to render the radial rake angles more positive, as shown in FIG. 7. The inserts of the invention, nevertheless, will outperform their conventional counterparts at all cutter radii in which the convex-flank insert can be usefully employed.

The selection of degree of convex curvature on the one hand and the desired radial rake for a given cutting assignment might call ideally for a different radius of convex curvature R for every diameter (2r) of endmill at the smaller end of conventional endmill sizes, particularly where maintenance of positive radial rake is a requirement. In practical terms, however, a compromise is desirably struck by providing a flank surface of convex curvature of radius approximately equal to or somewhat greater than the swing radius of the cutter, with greater curvature at lesser swing radii to maintain flank clearance and to facilitate a more positive radial rake, absent concavity of the rake faces.

As earlier stated, the position of the nose or bottom-cutting insert 20 in the endmill body 12' is determined by first placing the lower outer corner of the rake face (or the imaginary junction of the wiping edge 36 and side-cutting edge 26, if the corner has been rounded as at 37) on the desired cutting path 24 of the endmill, tilting the rake face 30 rearwardly to the positive axial rake angle desired, and then tipping the upper end of the cutting edge 26 radially outwardly to position it at the same swing radius r as the lower end of the cutting edge.

The position of the insert is then adjusted for the desired flank clearance, or clearance angle, between the convex flank or clearance face 22 of the insert and the cutting path 24 to be swept. That angle, for purposes of this invention, should be the smallest angle possible to prevent "heeling" of the clearance flank on the cut surface of the work but without raising the cutting power requirements inordinately by excessive growth of the wear land that will inevitably develop on the clearance surface behind the cutting edge as the insert wears.

This procedure is illustrated in Cartesian displacements in FIG. 4 in reference to a starting trial position with the bisecting radius of curvature of the end surface 32 of the insert coinciding with the X-axis, as would the convergence of the symmetrical rake faces 30 extended. With both ends of the cutting edge 26 disposed at the desired swing radius by tipping the upper end outwardly, the insert is then translated upwardly and inwardly along the cutting path 24, while maintaining the bisector radius parallel to the X-axis, until the desired degree of flank clearance is achieved.

The further factor to be taken into consideration is the radial rake of the rake face which is preferably positive, or as near thereto as possible, for cutting tough ductile metals such as the chrome-manganese steel earlier referred to, or titanium. For the lower end of the practical range of endmills for such purpose, it may be necessary, as earlier indicated, to groove the rake face longitudinally (FIG. 7) to increase its "sharpness", i.e., to render the rake face more positive.

Figure 6:
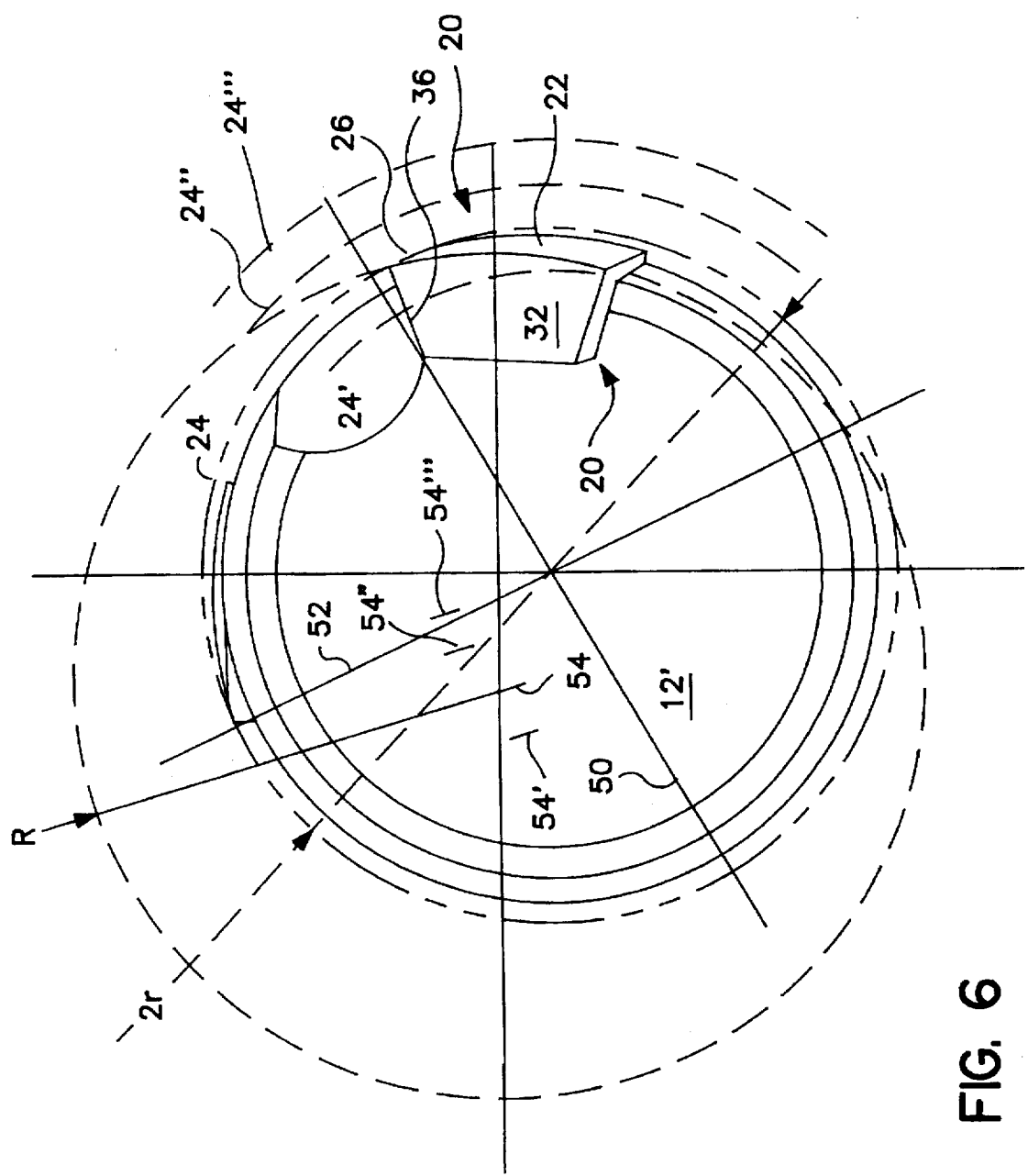
FIG. 6 is a diagram similar to that of FIG. 4 illustrating the placement of the cutting insert of the invention relative to a diameter of the endmill through the cutting point of one of the nose inserts of FIG. 5.

While the Cartesian displacement approach is the tool designer's pragmatic cut-and-try procedure, the result is re-examined in FIG. 6 with a view to determining an optimal range of endmill sizes that can be accommodated to advantage with a given insert, i.e., one chosen to have a radius of curvature somewhat larger than the radius of the cutting path of a small diameter endmill of standard size as earlier stated, and minimal arc length (width W, in FIG. 3(a)) consistent with strength requirements in view of the necessity for a central hole for the insert fastener. Such is the insert illustrated in FIG. 6.

The same insert may be employed effectively for a limited number of larger and smaller swing radii, limited by considerations of flank clearance in both instances. That is, as the swing radius is increased, a point is reached where the relatively lesser curvature of the cutting path requires excessive depression of the trailing edge of the insert to achieve a proper flank clearance angle, with consequent reduction of the strength advantage of the convex flank surface. Conversely, as the swing radius is reduced, the relatively greater curvature of the cutting path will require excessive depression of the trailing end of the insert to prevent rubbing on the workpiece, and require a greater than desirable flank clearance angle at the cutting edge, and a more negative radial rake.

FIG. 6 illustrates an optimal range of cutting radii for a given insert 20 in accordance with the invention, designed for the endmill 12', illustrated agreeably with FIGS. 4 and 6 as a two-tiered endmill of four inserts positioned as diametrical opposites in each tier, on diameters perpendicular to one another. The reference diameter 50 is taken through the lower corner of the nose insert and the perpendicular diameter 52 through the corresponding corner of the insert of the second or upper tier, only one insert of each tier being illustrated to avoid unnecessary complication of the diagram.

With the nose insert positioned with both ends of the cutting edge on the cutting path 24 and with the appropriate flank clearance angle at the cutting edge, the portion of the axis of curvature of the flank surface subtended by the insert is indicated by the reference numeral 54, being parallel to and of length equal to the cutting edge 26 as seen in FIG. 6.

In addition to the cutting path 24, there are illustrated three additional cutting paths 24', 24", and 24"', which are disposed at swing radii respectively 87.5%, 114%, and 130% of the swing radius of the design cutting path 24, the radius of the largest path 24"' being the radius of curvature of the flank surface 22 of the insert.

Positioning the nose insert on each of the alternate cutting paths in succession, with both ends of the cutting edge on the respective cutting paths and with the lower end of the cutting edge on the reference diameter 50, the successive projections of the subtended axis of curvature of the flank surface 22 of the insert take the successive positions 54', 54", and 54"' in FIG. 6.

From the diagram of FIG. 6 it will be noted that the projections of the subtended portion 54 of the axis of curvature of the flank surface of the insert lie on the side of the reference diameter 50 opposite to the trailing edge of the insert. Furthermore, each of the projections 54', 54, and 54" lie in the upper left-hand quadrant defined by the reference diameters 50 and 52.

Inasmuch as it has been found preferable for any given swing radius to select the radius of curvature of the ideal insert somewhat greater than the swing path, i.e., at about 130% of the swing radius, it follows from the diagram of FIG. 6 that the optimal and preferred range of cutter sizes in which a given insert may be expected to maximize the benefits of the invention are those in which the subtended portions of its axis of curvature lie within the quadrant of the reference diameters diagonally opposite that of the rearwardly-facing rake face of the insert, as an upper limit of cutter size appropriate for the given insert, and for a lower limit that such subtended axis portion further lie not more than half the swing radius distant from the perpendicular reference diameter 52.

The positioning of the upper tier inserts, if used, is performed identically to that described for "nose", or bottom cutting inserts.

Inserts in accordance with the invention, despite the relatively small configurational difference they exhibit over plane flank face inserts of the same general kind, have established their unanticipated superior strength and durability in small endmill service, as shown by the test results reported earlier in this specification.

The features of the invention believed patentable are set forth in the appended claims.

What is claimed is:

1. An indexable on-edge cutting insert for endmills comprising a block of cutting material having:

a plane major seating surface in the form of a parallelogram;

two pairs of opposed minor edge surfaces rising from said seating surface to an opposite major clearance surface;

one pair of said minor edge surfaces diverging symmetrically from said seating surface to said major clearance surface, and meeting said major clearance surface at an angle not exceeding ninety degrees to form cutting edges, said diverging minor edge surfaces constituting alternative rake faces of the insert;

said major clearance surface being convex to give said insert a uniform and greater thickness perpendicular to said seating surface along a mid-plane perpendicular to said seating surface and parallel to the intersections of said seating surface with said rake faces than at said intersections, and wherein said thickness along said intersections is also uniform;

any cross-section of said insert perpendicular to and intersecting both rake faces being symmetrical about said mid-plane; and a hole passing through said insert between said major surfaces centrally thereof, perpendicular to said seating surface, and countersunk from the clearance surface.

2. The insert of claim 1 wherein said rake faces are plane.

3. The insert of claim 1 wherein said rake faces are concave in said cross-section.

4. The insert of claim 1 wherein all said cross-sections are uniform.

5. The insert of claim 1 wherein the clearance surface is a section of a right circular cylinder, all linear elements of which are parallel to the intersections of said rake faces with said seating surface.

6. The insert of claim 5 wherein the rake faces are plane.

7. The insert of claim 5 wherein the rake faces are concave in said cross-section.

8. The insert of claim 5 adapted for bottom cutting, wherein said parallelogram is skewed, the other pair of said minor edge surfaces are each disposed at an interior angle of not greater than ninety degrees to said seating surface so as to constitute the intersections thereof with the rake faces as wiping edges at the acute-angle corners of the parallelogram insert, and the corner of each rake face adjacent said wiping edge is rounded by a circular bevel of the intersection of the clearance surface with the associated one of said other pair of minor edge surfaces.

9. The bottom-cutting insert of claim 8 wherein said circular bevel is tangent both to said other one minor edge surface and to said clearance face at their respective intersections with the rake face at their associated acute-angle corner of the insert.

10. An endmill comprising a tool body adapted for rotation by a tool spindle about an axis through said body, and having mounted thereon at least one cutting insert secured in an insert pocket in said tool body for rotation thereby at a given cutting radius;

said insert having the configuration specified by claim 10 and the radius of curvature of said clearance surface being within the range of from 100% to 130% of said cutting radius;

said insert being so positioned that one of said rake faces faces in the direction of rotation with both ends of the straight line cutting edge formed by its intersection with said clearance surface being disposed at said cutting radius; and said insert having the rearwardly facing rake face thereof depressed radially inwardly of said tool body sufficiently to provide flank clearance behind said cutting edge.

* * * * *

UNITED STATES PATENT AND TRADEMARK OFFICE
CERTIFICATE OF CORRECTION

PATENT NO.  : 5,692,860
DATED       : December 2, 1997
INVENTOR(S) : Rodney M. Kramer It is certified that error appears in the above-indentified patent and that said Letters Patent is hereby corrected as shown below:

Column 8, line 19, change "claim 10" to --claim 8--.

Signed and Sealed this

Twenty-fourth Day of November, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,692,860
DATED : December 2, 1997
INVENTOR(S) : Rodney M. Kramer

It is certified that error appears in the above-indentified patent and that said Letters Patent is hereby corrected as shown below:

On the Title Page, insert:

--[73] Assignee:   Ingersoll Cutting Tool Company, Rockford, Ill.--.

Signed and Sealed this

Fifteenth Day of June, 1999

Attest:

Attesting Officer

Q. TODD DICKINSON

Acting Commissioner of Patents and Trademarks